United States Patent [19]
Paczonay

[11] Patent Number: 5,725,018
[45] Date of Patent: Mar. 10, 1998

[54] GRAVITY CHECK VALVE

[76] Inventor: Joseph R. Paczonay, 3050 Aptos Hill La., Aptos, Calif. 95003

[21] Appl. No.: 306,972

[22] Filed: Sep. 16, 1994

[51] Int. Cl.⁶ .................................................. A47G 19/22
[52] U.S. Cl. ........................ 137/528; 137/433; 137/533; 220/705; 239/33
[58] Field of Search .................... 137/433, 528, 137/533; 215/1 A; 220/705, 706, 710; 229/103.1; 239/33

[56] References Cited

U.S. PATENT DOCUMENTS

| | | | |
|---|---|---|---|
| 1,519,832 | 12/1924 | Griffin | 137/433 X |
| 1,832,266 | 11/1931 | Thomas | 137/433 X |
| 1,878,947 | 9/1932 | Luff et al. | 137/433 |
| 1,993,732 | 3/1935 | Bijur | 137/533 X |
| 2,959,144 | 11/1960 | Youtie | 1137/528 X |
| 3,773,256 | 11/1973 | Wright | 239/33 X |
| 4,196,747 | 4/1980 | Quigley | 239/33 X |
| 4,296,778 | 10/1981 | Anderson | 137/433 |
| 4,428,490 | 1/1984 | Holloway | 215/1 A |
| 4,971,048 | 11/1990 | Seekins | 239/33 X |
| 5,199,633 | 4/1993 | Jantzen | 229/103.1 |

*Primary Examiner*—John Rivell

[57] ABSTRACT

My invention is a gravity check valve 20 that will have a relatively low back flow of liquid when the sealing seat 2 is positioned above the porous seat 8 and the direction of back flow of liquid is opposite to the direction of the force of gravity 18.

4 Claims, 3 Drawing Sheets

1

GRAVITY CHECK VALVE

TECHNICAL FIELD

This invention relates to a check valve suitable for use with manually powered drinking systems or other applications that require relatively low cracking pressures (0–1 cm of water), low flow rate (1–5 ml/sec.), and the sealing seat is above the porous seat and back flow of liquid is opposite to the direction of the force of gravity. The cracking pressure differential is created by the suction action of a person or some other low capacity pressure differential source.

BACKGROUND ART

Currently there exist few gravity check valves that operate in the low cracking pressure range (under 760 Torr of pressure) and none with sealing discs that are buoyed up by the liquid to make a relatively leak type seal with the valve sealing seat.

Nalgene makes a gravity check valve with a rubber disc that moves within the valve housing between a valve sealing seat to prevent liquid back flow and a porous seat to allow liquid flow. Liquid flow is allowed in one direction when the pressure differential from the valve sealing seat to the porous seat is positive. Back flow is prevented when said pressure differential is negative and the liquid wants to flow from the porous seat to the valve sealing seat. The disc material, however, is more dense than most drinking fluids and is too rigid. These issues prevent the check valve from stopping liquid back flow under the condition where the valve sealing seat is at a higher gravitational potential than the porous seat and the static fluid level in the delivery tubing that attaches to the output port of the check valve is at a higher gravitational potential than the sealing seat of the check valve. Since liquid back flow is opposite to the direction of the force of gravity, the dense rubber disc will tend to sink in the liquid and allow liquid to percolate back through the valve.

OBJECTS AND ADVANTAGES

Accordingly, several objects and advantages of my invention are relatively low cracking pressure (0–1 cm of water), low sealing back pressure (less than 1 cm of water), relatively low back flow leak rate, and the sealing seat can be located at a higher gravitational potential than the porous seat and the static liquid level in the delivery tubing that attaches to the output port of the check valve is at a higher gravitational potential than the sealing seat of the check valve. This invention is a simple and inexpensive check valve that can have the sealing seat above the porous seat such that the back flow direction of the liquid is opposite to the direction of the force of gravity and will prevent a substantial back flow of liquid.

Further objects and advantages of the my invention will become apparent from a consideration of the drawings and ensuing description.

Figure 1A:
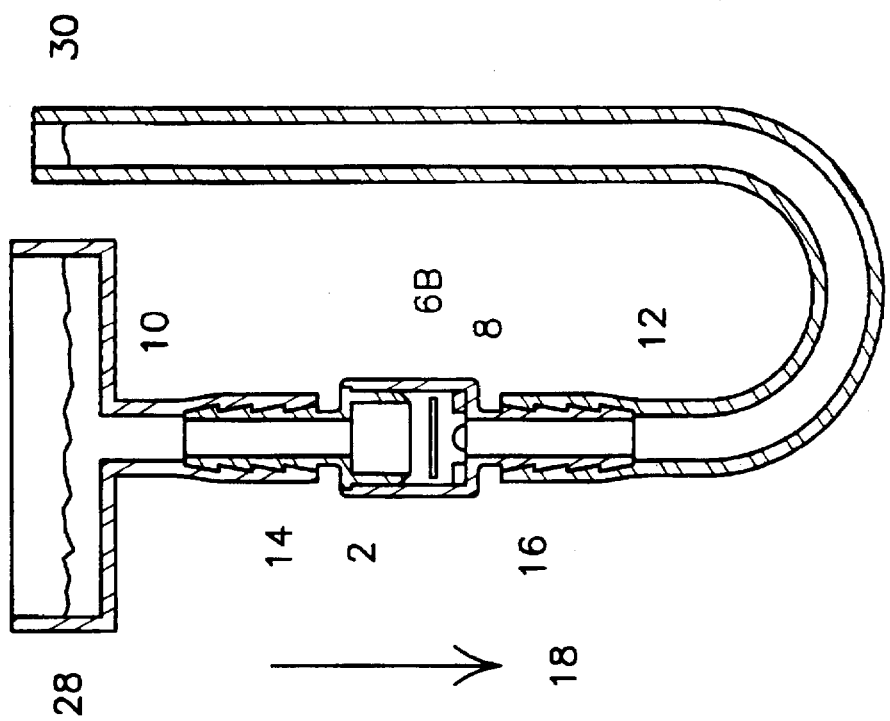
FIG. 1A is a cross-sectional view of the my invention for a check valve with two discs for preventing back flow of liquid.

LIST OF REFERENCE NUMERALS 2 sealing seat
4A thin low durometer disc
6A, 6B buoyant disc
8 porous seat
10 inlet port of liquid to check valve
12 outlet port of liquid from check valve
14 male insert of check valve with built-in sealing seat
16 female housing of check valve with built-in porous seat
18 direction of the force of gravity
20 check valve
22 buoyant force
24 direction of liquid flow
26 static liquid level in the check valve
28 liquid reservoir fluid level
30 static level of liquid in the exit tubing

SUMMARY OF INVENTION

This invention is a gravity check valve that will have a relatively low back flow of liquid when the sealing seat is positioned above the porous seat and the back flow of liquid is opposite to the direction of the force of gravity, low cracking pressure is required to allow for liquid flow, and low back pressure is required to prevent back flow of liquid.

DESCRIPTION OF INVENTION

FIG. 1A shows a cross-sectional view of the present invention with two discs. Disc 4 is very thin (under 0.015 inches) and is made of nonporous material with a durometer of 10–50. Buoyant disc 6 is made of material with a density that is lower than the density of the liquid. A sealing seat 2 is built into the male insert 14 of the check valve. The male insert 14 is press fit into a female housing 16 of the check valve. A porous seat 8 is built into the female housing 16. An inlet port 10 connects to a fluid supply by a tubing and an outlet port 12 connects to delivery tubing that conveys the liquid to a gravity level higher than the sealing seat 2.

Figure 1B:
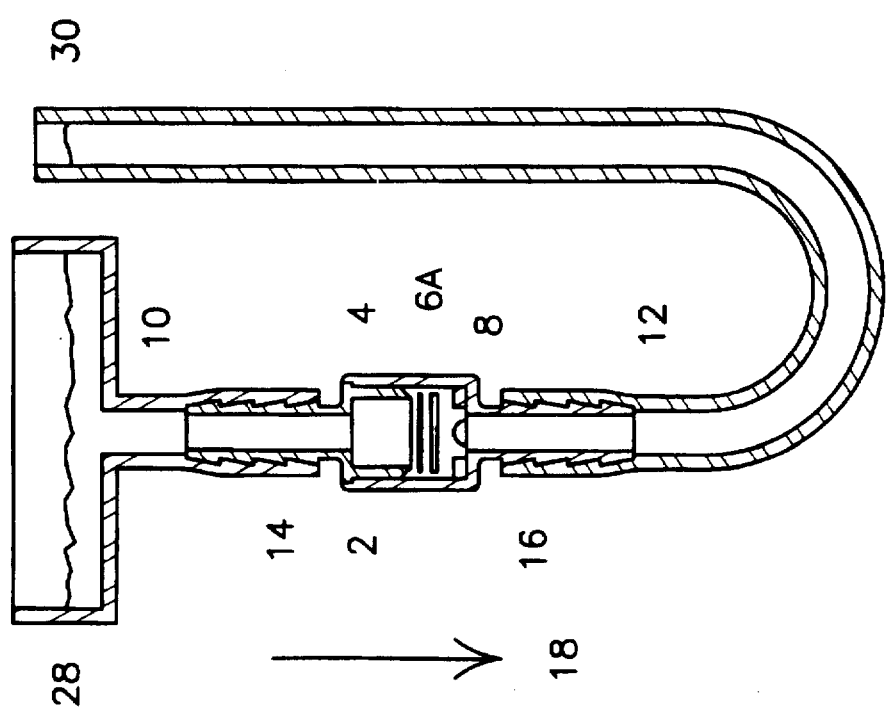
FIG. 1B is a cross-sectional view of the my invention for a check valve with one disc for preventing back flow of liquid.

FIG. 1B shows a cross-sectional view of the present invention with one disc 6B that is made of nonporous low durometer material with a density lower than the density of the liquid.

Figure 2B:
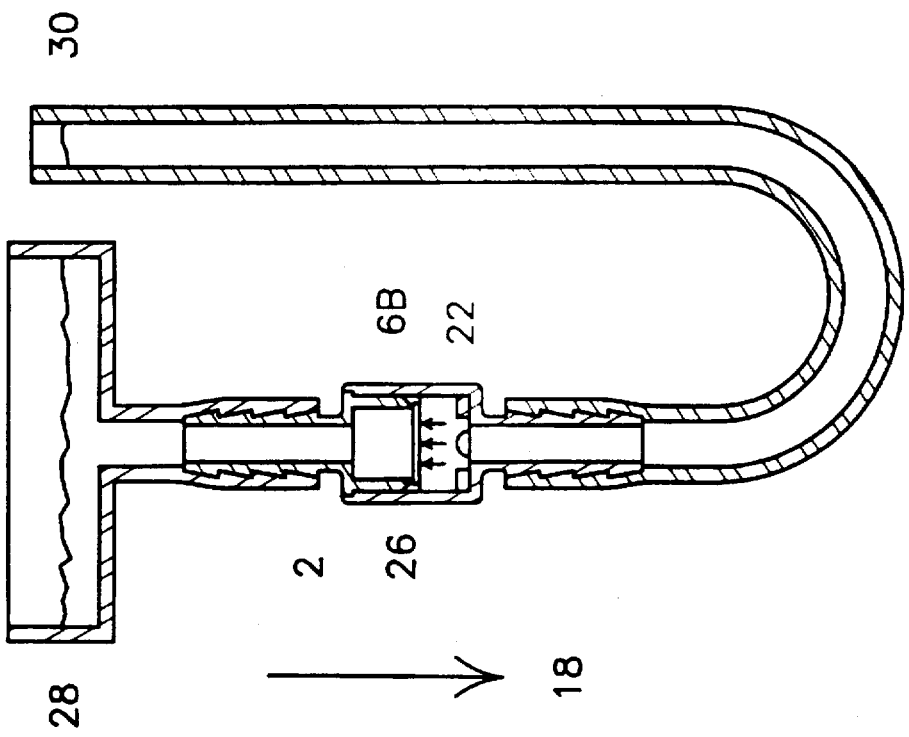
FIGS. 2A and 2B are cross-sectional views of the two embodiments shown in FIGS. 1A and 1B, respectively, of the check valve in the sealing mode of operation with a zero or negative pressure drop across the check valves.
Figure 2A:
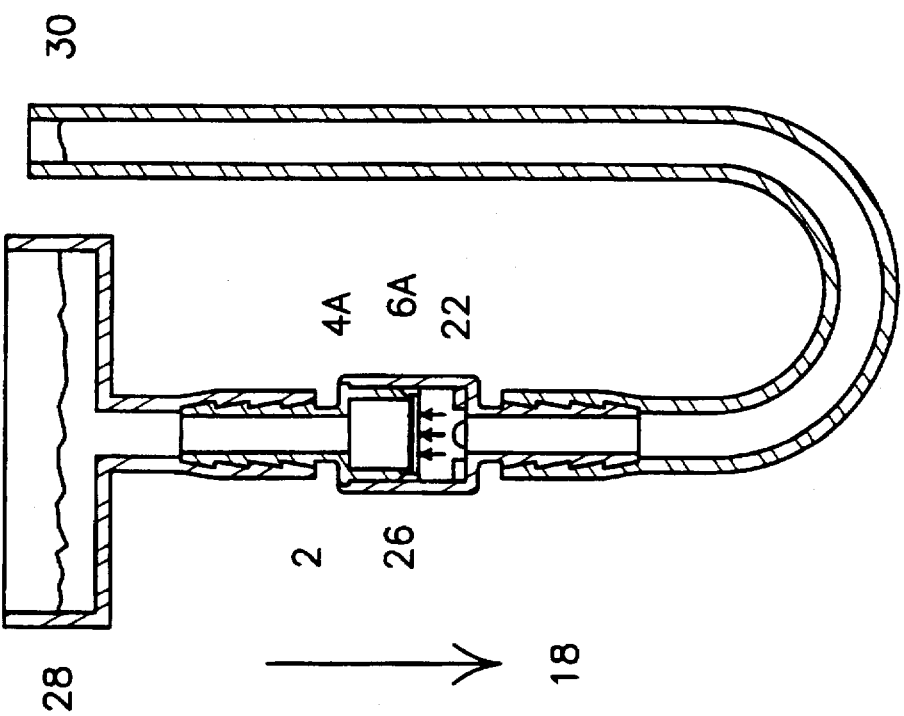

FIGS. 2A and 2B show cross-sectional views of the present invention with the discs 4A, 6A, 6B buoyed up by the fluid and/or the back pressure of the liquid in the output tube that connects to the output port 12. The pressure drop from the inlet port 10 to the outlet port 12 is zero or negative such that the back pressure or buoyant force 22 on the buoyant disc 6A, 6B press the discs 4A, 6B up into the sealing seat 2 to prevent back flow of the liquid.

Figure 3A:
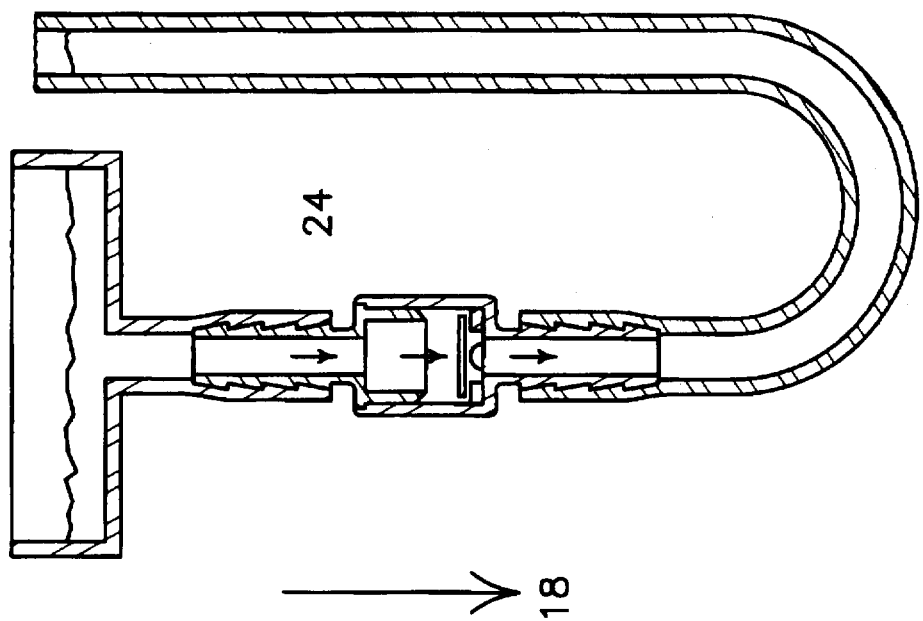
FIGS. 3A and 3B are cross-sectional views of the two embodiments shown in FIGS. 1A and 1B, respectively, of the check valve in the flowing mode of operation with a positive pressure drop across the check valves.
Figure 3B:
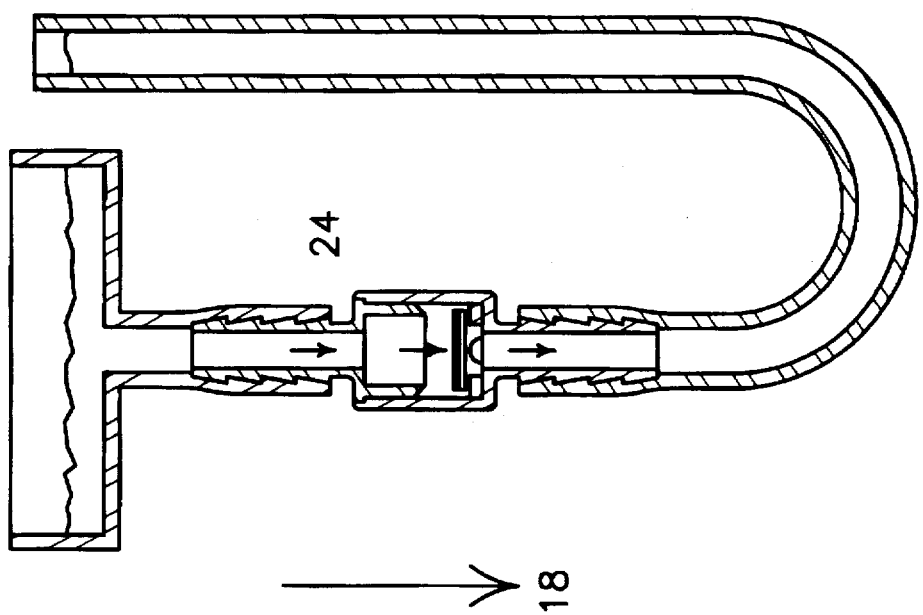

FIGS. 3A and 3B show cross-sectional views of the present invention with liquid flow through the check valve 20. In this mode the pressure drop from inlet port 10 to the outlet port 12 is positive such that the discs 4A, 6A, 6B are pushed away from the sealing seat 6 and onto the porous seat 8. The liquid is allowed to flow though inlet port 10 and out outlet port 12 up to the drinker of the liquid. The direction of liquid flow 24 through the check valve 20 is shown to be the same as the direction of gravity 18.

My invention is intended for conditions where the sealing seat 2 is used in a position above the porous seat 8 and the final liquid level 30 in the exit tubing is higher than the sealing seat 2 of the check valve 20. Under this condition the disc 4A, 6B will completely cover the sealing seat 2. The disc 6A, 6B are buoyed up by the liquid that will back fill when the pressure drop from inlet port 10 to the outlet port 12 is less than or equal to zero. The disc 6A, 6B will press disc 4A, 6B into the sealing seat 2 and no back flow of liquid will be allowed.

Although the description above contains many specifications, these should not be construed as limiting the scope of the invention but merely providing illustrations of some of the presently preferred embodiments of this invention.

I claim:

1. In combination:

liquid supply means including a container defining a container interior for containing liquid and having a container outlet communicating with said container interior;

a check valve for controlling dispensing of liquid from the container including a check valve housing defining a check valve housing interior, inlet defining means connected to said container and defining a first liquid flow path extending downward from said container interior to said check valve housing interior, outlet defining means communicating with said check valve housing interior and spaced from and disposed below said inlet defining means, said check valve housing defining a valve sealing seat at said inlet defining means and a porous valve seat at said outlet defining means, and a valve member positioned in said valve housing interior between said inlet defining means and said outlet defining means and movable between a sealing position wherein said valve member engages said valve sealing seat and prevents the flow of liquid from said check valve housing interior toward said container through said first liquid flow path and a non-sealing position spaced from said valve sealing seat and adjacent to said porous valve seat; and flow path means defining a second liquid flow path connected to said check valve housing for receiving liquid from the check valve housing interior through said outlet defining means, said flow path means defining a liquid exit opening communicating with said second liquid flow path and elevated relative to said inlet defining means, said valve member being constructed of material having a density less than the density of the liquid supplied by said liquid supply means whereby said valve member will be buoyed upwardly by liquid in said valve housing interior to said sealing position in engagement with said valve sealing seat when the pressure drop from said inlet defining means to said outlet defining means is less than or equal to zero and will move to said non-sealing position when the liquid pressure at said inlet defining means exceeds the liquid pressure at said outlet defining means.

2. The combination according to claim 1 wherein said check valve member comprises at least one floating disk.

3. A check valve for connection to a container defining a container interior for containing liquid and having a container outlet communicating with said container interior to control dispensing from said container, said check valve including a check valve housing defining a check valve housing interior, inlet defining means for connection to said container and defining a first liquid flow path for extending downward from said container interior to said check valve housing interior, outlet defining means communicating with said check valve housing interior and spaced from and disposed below said inlet defining means, said check valve housing defining a valve sealing seat at said inlet defining means and a porous valve seat at said outlet defining means, and a valve member positioned in said valve housing interior between said inlet defining means and said outlet defining means and movable between a sealing position wherein said valve member engages said valve sealing seat and prevents the flow of liquid from said check valve housing interior toward said container through said first liquid flow path and a non-sealing position spaced from said valve sealing seat and adjacent to said porous valve seat, said check valve for connection to flow path means defining a second liquid flow path for receiving liquid from the check valve housing interior through said outlet defining means, said flow path means defining a liquid exit opening communicating with said second liquid flow path for elevation relative to said inlet defining means, said valve member being constructed of material having a density less than the density of the liquid received from said container whereby said valve member will be buoyed upwardly by liquid in said valve housing interior to said sealing position in engagement with said valve sealing seat when the pressure drop from said inlet defining means to said outlet defining means is less than or equal to zero and will move to said non-sealing position when the liquid pressure at said inlet defining means exceeds the liquid pressure at said outlet defining means.

4. The combination according to claim 3 wherein said check valve member comprises at least one floating disk.

* * * * *